US009064015B2

(12) United States Patent
Urmy et al.

(10) Patent No.: US 9,064,015 B2
(45) Date of Patent: Jun. 23, 2015

(54) ACTION ALIGNMENT FOR EVENT PLANNING, PROJECT MANAGEMENT AND PROCESS STRUCTURING

(71) Applicants: Matthew B. Urmy, Nashville, TN (US); Jonathan A. Sexton, Knoxville, TN (US); John A. Curtis, Austin, TX (US)

(72) Inventors: Matthew B. Urmy, Nashville, TN (US); Jonathan A. Sexton, Knoxville, TN (US); John A. Curtis, Austin, TX (US)

(73) Assignee: Artist Growth, LLC, Nashville, TN (US)

( * ) Notice: Subject to any disclaimer, the term of this patent is extended or adjusted under 35 U.S.C. 154(b) by 186 days.

(21) Appl. No.: 13/925,699

(22) Filed: Jun. 24, 2013

(65) Prior Publication Data
US 2014/0379750 A1    Dec. 25, 2014

Related U.S. Application Data

(62) Division of application No. 13/326,126, filed on Dec. 14, 2011, now Pat. No. 8,615,504.

(51) Int. Cl.
G06F 17/30 (2006.01)
G06Q 10/06 (2012.01)
G06Q 10/10 (2012.01)

(52) U.S. Cl.
CPC .... G06F 17/30864 (2013.01); G06F 17/30292 (2013.01); G06Q 10/0631 (2013.01); G06Q 10/109 (2013.01)

(58) Field of Classification Search
USPC .................................. 707/792, 793, 802, 803
See application file for complete search history.

(56) References Cited

U.S. PATENT DOCUMENTS

| 7,349,894 | B2 | 3/2008 | Barth et al. | |
| 7,383,357 | B2 | 6/2008 | Leichter et al. | |
| 7,418,482 | B1* | 8/2008 | Lusher et al. | 709/219 |
| 7,466,334 | B1* | 12/2008 | Baba | 348/14.06 |
| 7,685,025 | B2 | 3/2010 | Islam | |
| 2002/0016729 | A1* | 2/2002 | Breitenbach et al. | 705/9 |
| 2003/0033187 | A1* | 2/2003 | Jones et al. | 705/9 |
| 2005/0033615 | A1 | 2/2005 | Nguyen et al. | |
| 2005/0203783 | A1 | 9/2005 | Allen et al. | |
| 2007/0021998 | A1* | 1/2007 | Laithwaite et al. | 705/9 |
| 2008/0072225 | A1* | 3/2008 | Nagatsuka et al. | 718/100 |
| 2008/0092059 | A1 | 4/2008 | White | |
| 2008/0201196 | A1 | 8/2008 | Rowland | |

(Continued)

OTHER PUBLICATIONS

"EventPro Planner" [online], retrieved on Sep. 19, 2011, from the Internet URL:http://www.eventsoftware.com.au/.

(Continued)

Primary Examiner — Cam-Linh Nguyen
(74) Attorney, Agent, or Firm — Jack V. Musgrove

(57) ABSTRACT

An action alignment system for event planning and execution searches out web sites relating to event planning and, based on web site content, constructs a database of various tasks that might be desired for different events (tasks can also be manually added to the database). The tasks have associated tags which allow a task search engine to match a user query representing a proposed event to potential tasks. This list of potential tasks is presented to the user who may then select the tasks as desired to customize the event plan. Vendors can provide pre-packaged deals for the tasks, and this information can be included with the task database, selected by the user, and added to the event plan. A scheduler and alert engine then inserts appropriate entries into the user's calendar, and sends timely alerts to the user which include links that simplify event management.

17 Claims, 6 Drawing Sheets

| TASK | TAGS | VENDOR PACKAGES |
|---|---|---|
| food<br>-order<br>-confirm | concert, anniversary, wedding, concessions, birthday, ... | Acme_Distributing_Package7: 500 hors d'oeuvres, ...;<br>Joe's_Burgers_Package1: 1,000 hamburgers, ...; ... |

98

(56) References Cited

U.S. PATENT DOCUMENTS

| | | | |
|---|---|---|---|
| 2008/0281617 A1* | 11/2008 | Conrad et al. | 705/1 |
| 2008/0301190 A1 | 12/2008 | Lockhart et al. | |
| 2009/0320047 A1 | 12/2009 | Khan et al. | |
| 2010/0030578 A1* | 2/2010 | Siddique et al. | 705/3 |
| 2010/0057643 A1* | 3/2010 | Yang | 706/11 |
| 2010/0169146 A1* | 7/2010 | Hoyne et al. | 705/9 |
| 2010/0333113 A1* | 12/2010 | Johnson et al. | 719/318 |
| 2011/0258125 A1 | 10/2011 | Iyer | |
| 2012/0060166 A1* | 3/2012 | Jardine et al. | 718/104 |
| 2012/0136689 A1 | 5/2012 | Ickman et al. | |

OTHER PUBLICATIONS

"Mightybell FAQ" [online], retrieved on Nov. 14, 2011, from the Internet URL:https://mightybell.com/faq.

* cited by examiner

| TASK | TAGS | VENDOR PACKAGES |
|---|---|---|
| food<br>-order<br>-confirm | concert, anniversary, wedding, concessions, birthday, ... | Acme_Distributing_Package7: 500 hors d'oeuvres, ...;<br>Joe's_Burgers_Package1: 1,000 hamburgers, ...; ... |

98

ACTION ALIGNMENT FOR EVENT PLANNING, PROJECT MANAGEMENT AND PROCESS STRUCTURING

CROSS-REFERENCE TO RELATED APPLICATION

This application is a divisional of copending U.S. patent application Ser. No. 13/326,126 filed Dec. 14, 2011.

BACKGROUND OF THE INVENTION

1. Field of the Invention

The present invention generally relates to event planning, project management, and process structuring, and more particularly to systems and methods for creating and executing action packs used to guide an event plan, or preparation process.

2. Description of the Related Art

Planning for large events such as weddings, seminars, birthdays, promotions, concerts, etc., can be both difficult and tedious. There are usually a sizable number of tasks that must be executed within rigid deadlines. Each task can be quite complicated and may involve multiple parties. Accordingly, a wide variety of event planning tools have been designed to simplify the process.

With the advent of digital networks like the Internet and the proliferation of personal computing devices, modern event planning tools are often embodied in online or web-based systems. These systems can also provide assistance in locating service providers for the event. U.S. Pat. No. 7,685,025 describes a web-based integrated event planning and management system which allows searching for different types of vendors (entertainment, venue, catering, limousine) according to various criteria such as the type of event, location, cuisine, etc. Links are made available to view packages provided by vendors meeting the criteria. U.S. Patent Application Publication No. 2008/0092059 is directed to online planning of events and allows the user to input aesthetic preferences which may be used for vendor selection from a list of vendors. That system can further provide thumbnail images for various vendor samples. U.S. Patent Application Publication No. 2008/0201196 teaches an event planning system which uses computer-implemented applications for various aspects of event management including task planning and vendor selection. A task manager generates predefined tasks, including generalized tasks that apply to all events, and other tasks focused on the particular event. Virtual "sticky notes" can be applied to a task as a reminder for associated information.

Many prior art event planners also provide support for scheduling and/or reminders regarding tasks that need to be completed. U.S. Patent Application Publication No. 2009/0320047 provides an event bundling system which sorts event information into alerts, fixed schedule events, and flexible schedule events. A listing of prioritized events can then be presented to the user. One planning system marketed as "EventPro" is based around event planning templates which auto generate event timelines and critical paths for various types of events. Wizards guide the user through the steps of event bookings, and automatic reminders notify users of impending tasks.

SUMMARY OF THE INVENTION

Embodiments of the present invention are directed to systems, methods, and computer program products for event preparation and process structuring and execution. According to one embodiment a database of potential tasks for an event is constructed by searching a network to locate a network site having content relating to the event, parsing the content to identify at least one task relating to the event, associating one or more tags with the task, and storing the task relating to the event in association with the tags.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

While prior art event planning systems can simplify certain aspects of creating an event plan having multiple tasks, those systems only provide pre-packaged tasks lists and thus do not have sufficiently flexibility to generate comprehensive plans for all end users. It would, therefore, be desirable to devise an improved event planning system which could more effectively translate a user's intentions and desires into an event plan, and could further allow users to easily edit the event plan and tailor the task lists according to the user's preferences. It would also be advantageous if the improved event planning system could integrate all of the event planning functions for seamless operation by the end user with interfaces that are easy to understand and use.

The present invention provides such an improved event planning system which allows a user to input a search query representing an event, and returns a list of potential tasks (preparation steps) for the event. The user can then select tasks from the list that appear appropriate to create the customized event plan. This plan can then be used to obtain vendor packages for various tasks, schedule reminders, and send alerts to the user's smartphone and other computing devices, allowing the user to completely manage the entire process from the desktop or the palm of her hand.

Figure 1:
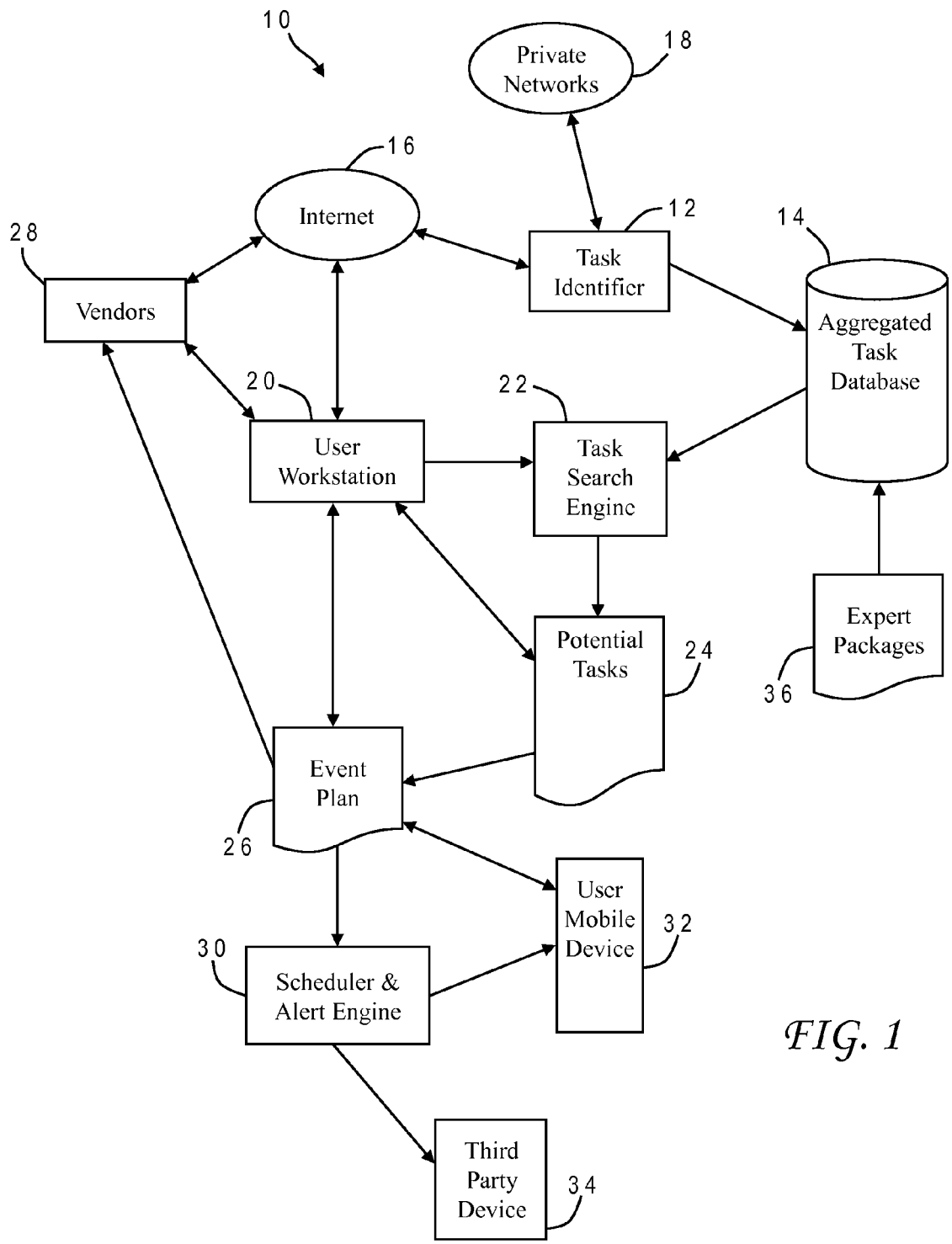
FIG. 1 is a high-level block diagram of a composite system constructed in accordance with one embodiment of the present invention wherein a user operates a task search engine to query an aggregated task database and obtain a list of potential tasks for a planned event.

With reference now to the figures, and in particular with reference to FIG. 1, there is depicted a high-level composite system 10 having various components which can function as separable and independent subsystems but are illustrated together for purposes of this overview in accordance with one implementation of the invention. One subsystem is a task aggregation system comprised of a task identifier agent 12 and an aggregated task database 14. Task identifier agent 12 and aggregated task database 14 may reside on different hardware systems or can be consolidated in a single system such as the computer workstation described below in conjunction with FIG. 2. Task identifier agent 12 can communicate with the Internet 16 and other private networks 18 using conventional techniques such as TCP/IP packet transmission, hypertext transfer protocol, webservices, etce. Task identifier agent 12 is programmed to crawl through the Internet 16, or private networks 18, and search for network locations (e.g., web sites) having content that is possibly related to major events. As discussed in more detail below in conjunction with FIG. 3, task identifier agent 12 parses content of an identified web site to create potential tasks for an event. Task identifier agent 12 then stores the potential tasks in aggregated task database 14 with associated indicia as discussed further below in conjunction with FIG. 4.

Another subsystem within composite system 10 is a user event search system comprised of a user workstation 20, a task search engine 22, and aggregated task database 14. User workstation 20 may be a client device such as the computer system described below in conjunction with FIG. 2, or may be a mobile computing device such as the smartphone described below in conjunction with FIG. 5. Task search engine 22 may reside on user workstation 20 or may be a separate computer system (e.g., server), or may be consolidated with task identifier agent 12 and aggregated task database 14 in a single hardware system. User workstation 20 is used to transmit a search query representing a proposed event to task search engine 22. User workstation 20 may access task search engine 22 directly or via Internet 16. In the illustrative embodiment the user also enters the anticipated date of the proposed event with the search query. Task search engine 22 matches the user's query to one or more tasks in aggregated task database 14, and presents a list 24 of potential tasks for the proposed event to the user, i.e., task search engine 22 transmits the list to user workstation 20. The user can then select specific tasks from the potential list to craft an event plan 26, as described further below in conjunction with FIG. 6. Event plan 26 can be edited by the user whenever desired, by deleting existing tasks or adding more tasks. In the preferred implementation of the invention, the potential tasks in list 24 have pre-defined service packages available from vendors for at least some of the tasks, as described further below in conjunction with FIG. 9. Event plan 26 can accordingly be used as a springboard to work with vendors 28 online or through other forms of electronic business transactions.

Another subsystem within composite system 10 is an event management system comprised of a scheduler and alert engine 30 and the user's mobile electronic device 32. Scheduler and alert engine 30 may reside on a remote computer workstation such as that seen in FIG. 2, or may be downloaded to and operating on user mobile device 32. User mobile device 32 may be the smartphone illustrated in FIG. 5. Scheduler and alert engine 30 is governed by the event plan 26, and is programmed to distribute preparation points throughout the user's calendar system residing on user mobile device 32 and to send timely notifications to user mobile device 32, based on the anticipated date of the proposed event relative to each task selected for event plan 26. Scheduler and alert engine 30 may also be programmed to send scheduling and/or alert information to third parties 34, such as vendors, event participants, or promotional outlets. In this manner, the user can be prompted by her handheld device to perform preparation steps and actions tasks leading up to the event, in an order- and time-sensitive fashion, with links to expert information for further help in efficiently performing the task.

Aggregated task database 14 may also include expert packages 36 comprising a library of pre-made lists of action steps that are created by experts in the field. These packages can be presented along with the general list of tasks (from which the user can create their own unique plan). So, if the user prefers to utilize a package that is made by a professional expert instead of building their own, then they can either purchase it from the expert vendor, or if it is made available for free, simply activate it to their calendar via the process described further below.

Figure 2:
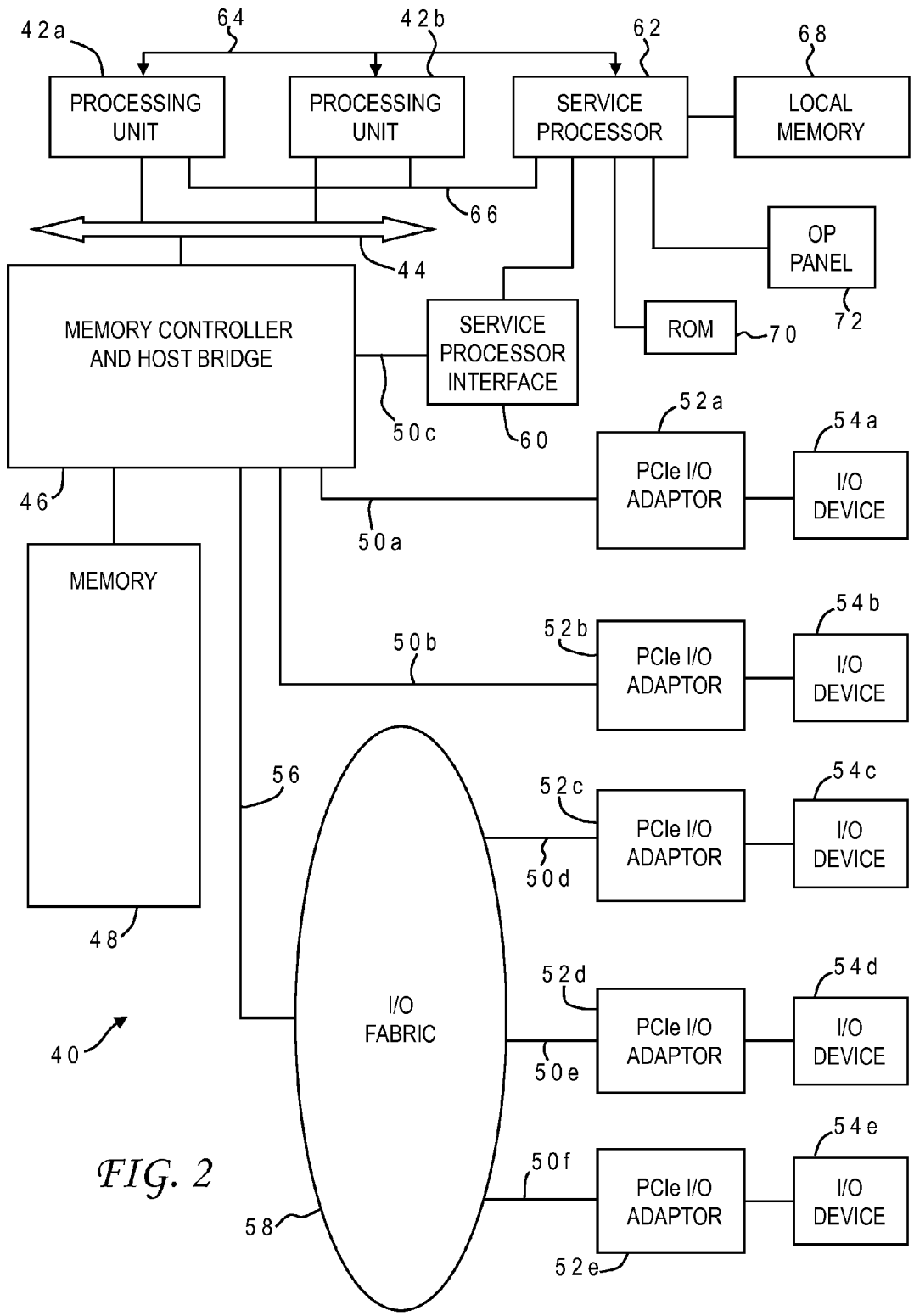
FIG. 2 is a block diagram of a computer system programmed to carry out any of task creation, event planning, or task scheduling in accordance with one implementation of the present invention.

FIG. 2 illustrates one example 40 of a computer system in which embodiments of the present invention may be implemented to carry out event planning and management. Computer system 40 is a symmetric multiprocessor (SMP) system having a plurality of processors 42a, 42b connected to a system bus 44. System bus 44 is further connected to a combined memory controller/host bridge (MC/HB) 46 which provides an interface to system memory 48. System memory 48 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 46 also has an interface to peripheral component interconnect (PCI) Express links 50a, 50b, 50c. Each PCI Express (PCIe) link 50a, 50b is connected to a respective PCIe adaptor 52a, 52b, and each PCIe adaptor 52a, 52b is connected to a respective input/output (I/O) device 54a, 54b. MC/HB 46 may additionally have an interface to an I/O bus 56 which is connected to a switch (I/O fabric) 58. Switch 58 provides a fan-out for the I/O bus to a plurality of PCI links 50d, 50e, 50f. These PCI links are connected to more PCIe adaptors 52c, 52d, 52e which in turn support more I/O devices 54c, 54d, 54e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 46 provides a low latency path through which processors 42a, 42b may access PCI devices mapped anywhere within bus memory or I/O address spaces. MC/HB 46 further provides a high bandwidth path to allow the PCI devices to access memory 48. Switch 58 may provide peer-to-peer communications between different endpoints and this data traffic does not need to be forwarded to MC/HB 46 if it does not involve cache-coherent memory transfers. Switch 58 is shown as a separate logical component but it could be integrated into MC/HB 46.

In this embodiment, PCI link 50c connects MC/HB 46 to a service processor interface 60 to allow communications between I/O device 54a and a service processor 62. Service processor 62 is connected to processors 42a, 42b via a JTAG interface 64, and uses an attention line 66 which interrupts the operation of processors 42a, 42b. Service processor 62 may have its own local memory 68, and is connected to read-only memory (ROM) 70 which stores various program instructions for system startup. Service processor 62 may also have access to a hardware operator panel 72 to provide system status and diagnostic information.

In alternative embodiments computer system 40 may include modifications of these hardware components or their interconnections, or additional components, so the depicted example should not be construed as implying any architectural limitations with respect to the present invention. The invention may further be implemented in an equivalent cloud computing network.

When computer system 40 is initially powered up, service processor 62 uses JTAG interface 64 to interrogate the system (host) processors 42a, 42b and MC/HB 46. After completing the interrogation, service processor 62 acquires an inventory and topology for computer system 40. Service processor 62 then executes various tests such as built-in-self-tests (BISTs), basic assurance tests (BATs), and memory tests on the components of computer system 40. Any error information for failures detected during the testing is reported by service processor 62 to operator panel 72. If a valid configuration of system resources is still possible after taking out any components found to be faulty during the testing then computer system 40 is allowed to proceed. Executable code is loaded into memory 48 and service processor 62 releases host processors 42a, 42b for execution of the program code, e.g., an operating system (OS) which is used to launch applications and in particular the event planning and management applications of the present invention, results of which may be stored in a hard disk drive of the system (an I/O device 54). While host processors 42a, 42b are executing program code, service processor 62 may enter a mode of monitoring and reporting any operating parameters or errors, such as the cooling fan speed and operation, thermal sensors, power supply regulators, and recoverable and non-recoverable errors reported by any of processors 42a, 42b, memory 48, and MC/HB 46. Service processor 62 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, C# or the like and conventional procedural programming languages, written for a variety of platforms such as an AIX environment or operating systems such as Windows 7, Linux, iOS or Android. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 40 can carry out program instructions for an event planning process that uses novel search engine techniques to create potential tasks for an event plan, and for an event management process based on that plan. Accordingly, a program embodying the invention may include conventional aspects of various event planning tools, and these details will become apparent to those skilled in the art upon reference to this disclosure.

Figures 3, 4:
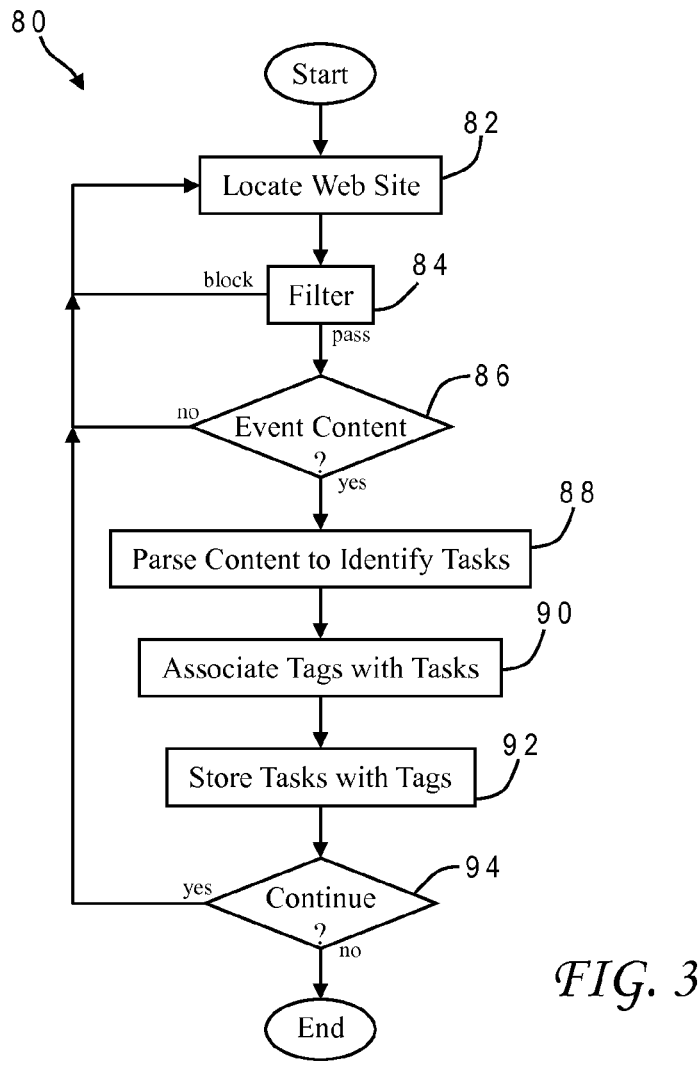
FIG. 3 is a chart illustrating the logical flow for a task creation process which crawls through web sites to discover event content and parses the content into tasks with associated searchable information in accordance with one embodiment of the present invention.
FIG. 4 is a pictorial illustration of an exemplary entry in the task database including a task field, a tag field, and a vendor package field, in accordance with one implementation of the present invention.

Referring now to FIG. 3, there is depicted a chart illustrating the logical flow for a task creation process 80 in accordance with one embodiment of the present invention which may be carried out by the task identifier agent. The process begins when the agent locates a new web site (82). Conventional web crawling techniques may be used such as cycling through IP addresses, investigating links on previously discovered web sites, and utilizing existing network search engines. The system administrator can also manually point out specific web sites known to have appropriate information to the task identifier agent. The current web site is checked by a filter which blocks sites having low traffic or poor credibility, and duplicate returns (84). The traffic or credibility of a site may be determined using a ratings agency such as Alexa or Google. If the web site does not meet the filter criteria, the process returns to box 82 to find the next web site. If the filter passes the current web site, it is initially examined for event content (86). Events searched for may include birthdays, anniversaries, weddings, reunions, concerts, seminars, funerals, holiday parties, raves, bar/bas mitzvahs, conventions, educational courses, quinceañeras, religious gatherings, travel, sports training or games, etc. Those skilled in the art will appreciate that this list is exemplary only and is not intended to be exhaustive, so it should not be construed in a limiting sense, as the invention can be applied to any activity that involves task planning and completion.

The task identifier agent can determine if a web site has sufficient content relating to an event using a confidence value that is based on various factors relating to the web site, that is, according to the content as embedded in the particular program code for the web site, such as hypertext markup language (HTML) or extensible markup language (XML) coding. For example, if the web site repeatedly uses an event-related term or terms from a pre-existing library of such terms (e.g., the exemplary events listed above), then there is a greater likelihood that the web page has event-related content. Further, if the web page refers to phrases such as "how-to", "to-do list", "tasks", "action steps", "preparation", "first," "initially", "then," "after," "step 1", etc., then the task identifier agent can infer that the page is related to planning for the identified event. Extra weight can be given if terms appear in the title or other significant coding fields, such as <li> (list items), <ol> (ordered list), <dd> data definition, <dt> (definition term), or <dl> definition list.

The task identifier agent may further include intelligent logic which identifies more complicated phrases and word combinations that have previously been associated with different types of events or tasks. In an advanced implementation, the task identifier agent utilizes a neural network to determine whether a web site relates to tasks for an event. The neural network can be trained using a group of known web sites or specifically designed pages (preferably hundreds or thousands) which clearly deal with event planning, and can learn over time through feedback from administrator review and correction regarding sites which have been rated by the neural network.

If the task identifier agent does not generate a sufficient confidence value for the site as being event-related, it is discarded and the process again returns to box 82. If the agent determines that the web site does pertain to event content, the event type(s) is noted, and the content is parsed to curate any tasks suggested by the site (88). For example, the agent may determine that a particular web site relates to weddings, and extracts "wedding dress" as a task associated with the event. The task identifier agent can be programmed to use syntax and grammar rules to recognize action phrases or known word patterns (such as those listed above), and can automatically cut-and-paste recognized text from the web site corresponding to a potential task. More complicated logic can be used to decipher tasks from the page content including artificial intelligence programs which analyze the context using semantic rules. The database task creation administrator may optionally review and refine descriptions for identified tasks. Raw data concerning the web site (e.g., relevant keywords from the site, popularity on Google, URL, author, last modified date) can be stored for historical purposes, and the site can be revisited for additional data mining.

The noted event type for the web site can be used as a tag for matching the task to a user query, and the task identifier agent can also associate other tags or searchable indicia with the task based on correlations with the event type (90). For example, with the web site relating to weddings, the task identifier agent will not only associate the tag "wedding" with tasks derived from that site, but may further associate other tags such as "shower" or "rehearsal dinner" using a compendium of event-related terms that are correlated in a thesaurus-like manner. Tags may also include keywords gleaned from the current web site. Tags may further be weighted so the results of the task search engine can be prioritized based on the weightings, with the most likely required tasks appearing at the beginning of the list and the least likely tasks appearing at the end. The tags can then be stored in association with the task in the aggregated task database, or merged with an existing task that matches the task parsed from the content (92). Fuzzy logic rules can be used to automatically determine matching tasks. Alternatively, the administrator can periodically review the aggregated task database for redundant tasks and consolidate those into a single entry, i.e., having tags from each consolidated task. After all of the parsed tasks for the current web site have been stored in the database, the program can check for termination criteria such as a certain number of web sites processed or a time restriction (94). If the termination criteria is met the process is complete, otherwise it continues iteratively at box 82 with the next located web site.

Identification of "how-to" web sites and parsing their content may become easier with the arrival of "Web 3.0" technology which uses, among other things, a semantic markup (nomenclature) model. This model allows designers to create special data structures referred to as microformats. Microformats can include metadata about pages and how they are related to each other, enabling automated agents to access the Web more intelligently and perform tasks on behalf of users. The present invention may accordingly extend to interpreting a microformat directed to an event planning page having properties including one or more identified events and a plurality of tasks, optionally having other associated details such as required lead time for the task.

In addition to the automated procedure 70 of FIG. 3, tasks can be manually added to aggregated task database 14 by an administrator.

An example of an entry in the aggregated task database is shown in FIG. 4. This entry item 90 is for the task "food". The entry 98 includes three fields, including a task description field, a tags field, and a vendor packages field. The task description field may include sub-tasks, e.g., "order food" and "confirm food" used by the scheduler and alert engine. The tag field includes any tags which have been associated with this event (and optionally their weightings). The vendor packages field includes any pre-packaged service details being offered by vendors for the task, such as the details that are input by the vendors as described below in conjunction with FIG. 9. Task search engine 22 can accordingly search entries in aggregated task database 14 to find matching tasks based on comparisons of the user's event query to the associated tags, and can include any vendor package information in the resulting event plan customized by the user.

Figure 5:
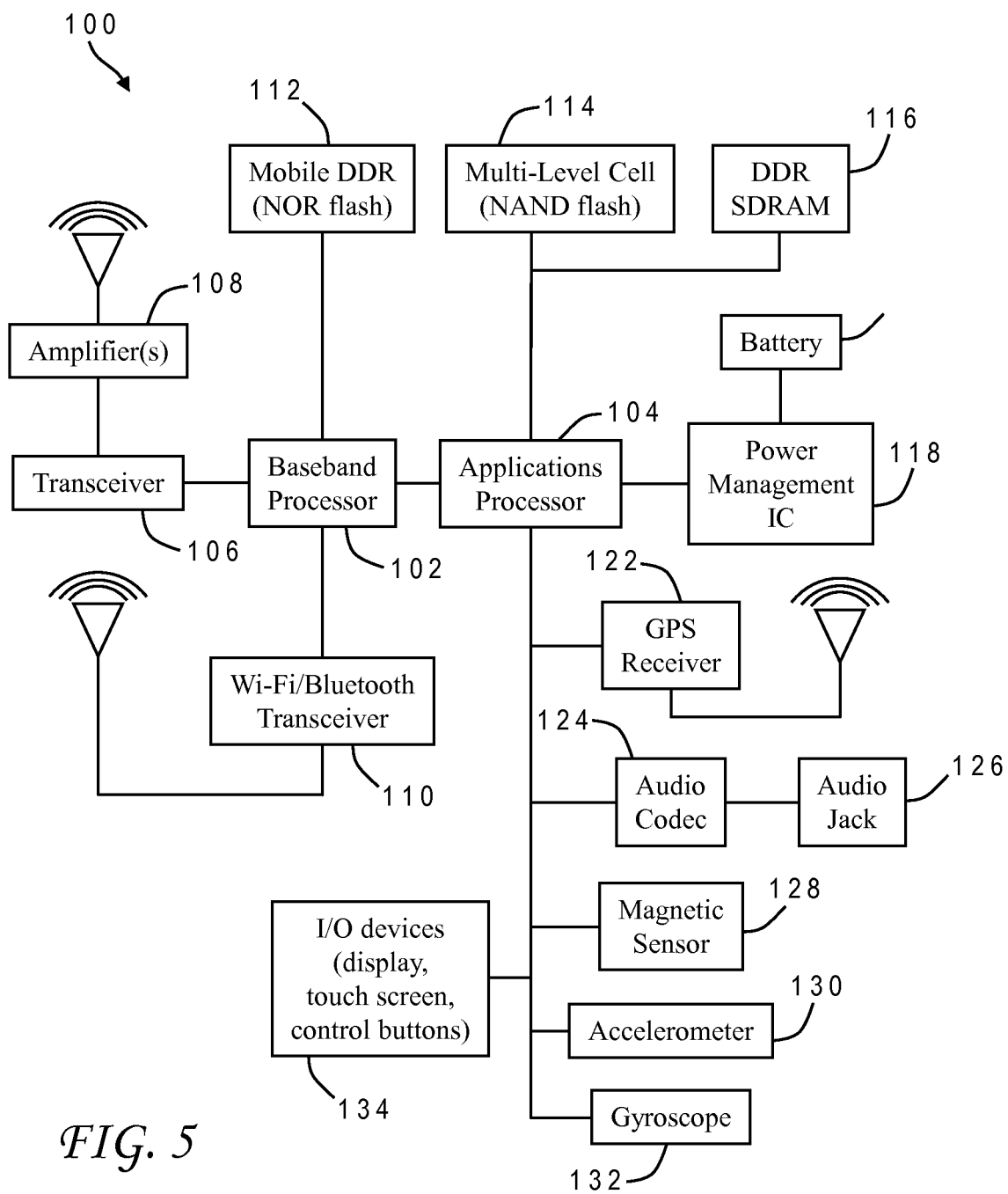
FIG. 5 is a block diagram of a mobile personal computer device (e.g., smartphone) programmed to carry out event management in accordance with one implementation of the present invention.

FIG. 5 illustrates one example 100 of a mobile computing device or smartphone in which embodiments of the present invention may be implemented to carry out event planning and management by the user. As with computer system 40, alternative embodiments of smartphone 100 may include modifications of the hardware components or their interconnections, or additional components, so the depicted example should not be construed as implying any architectural limitations with respect to the present invention. In this example smartphone 100 includes a baseband processor 102 and an applications processor 104. Baseband processor 102 manages most of the radio (wireless communications) functions of smartphone 100, including communication with a wireless service provider (including Internet transmissions) via a transceiver 106 which is connected by one or more power amplifiers 108 to a network antenna. Baseband processor can also control Wi-Fi and Bluetooth transmissions through transceiver 108 connected to a local antenna. Baseband processor 102 uses a dedicated mobile DDR memory (NOR flash) 112.

Baseband processor 102 essentially acts as an input/output (I/O) device with respect to applications processor 104 which executes the software programs (apps) embodying the invention. Applications processor 104 preferably utilizes multi-level cell memory (NAND flash) 114 and DDR synchronous dynamic random-access memory (SDRAM) 116. Applications processor 104 can interact with a power management integrated circuit 118 to control the power supply (battery) 120. Applications processor 104 can additionally receive inputs from a variety of peripheral devices such as a global positioning satellite (GPS) receiver 122 connected to a GPS antenna, an audio codec 124 which drives an audio (e.g., headphone) jack 126, a magnetic sensor 128 for azimuthal indication, an accelerometer 130 for crash detection and prevention, and a 3-axis gyroscope 132 for orientation indication, and user I/O devices 134 (e.g., touch screen/display and control buttons). Smartphone 100 may include many other hardware features not illustrated, for example, a camera and associated driver circuitry.

When smartphone 100 is first turned on, baseband processor 102 and applications processor 104 may perform various tests such as built-in-self-tests or memory tests on the memory components 112, 114, 116. If the systems pass the tests then each processor begins execution of its primary code, namely, a communications link for baseband processor 102 and an operating system for applications processor 104. Once the network communications have been established by baseband processor 102 and the operating system is loaded by applications processor 104, the user can enter appropriate commands via the touch screen to load executable code representing embodiments of the present invention for execution by applications processor 104.

Figure 6:
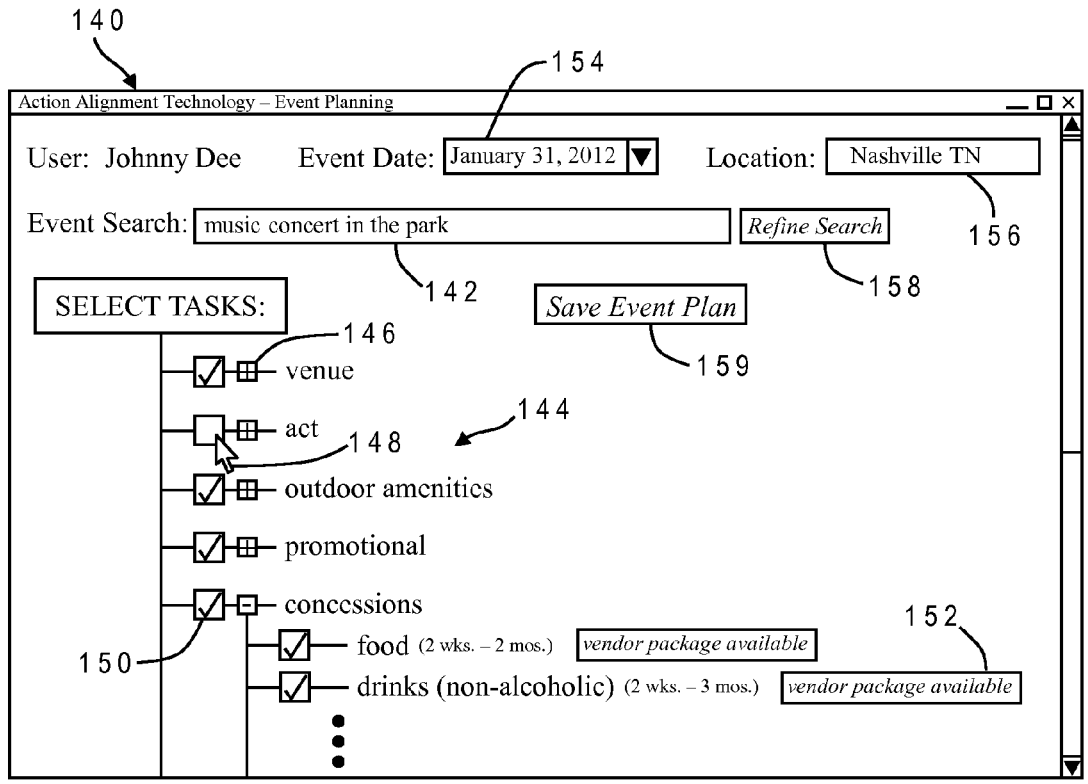
FIG. 6 is a graphical user interface for the task search engine of FIG. 1 depicting an exemplary search results task list for a music concert in the park event, in accordance with one embodiment of the present invention.

With further reference to FIG. 6, there is depicted a graphical user interface 140 provided by a software application in accordance with one implementation of the present invention. Interface 140 may be presented on the display screen of any user device, such as user workstation 20 or mobile computing device 32, although the programming which generates interface 140 (in this embodiment, task search engine 22) resides on a remote computer server and is accessed via the Internet or other network service provider. Task search engine 22 may allow different users to create unique accounts, and an account's username can be displayed as part of interface 140. Interface 140 includes an event search field 142 which allows a user to enter a free-form query representing an event (i.e., an infinite number of possible event descriptions). When a user enters the event title into the search engine, a list 144 of potential preparation steps/tasks is populated on the screen. In this example the user has entered a query of "music concert in the park", and the task results are grouped into different categories, including venue, act, outdoor amenities, promotional, and concessions. Tasks for a given category can be detailed or hidden by clicking on the plus/minus box 146 next to the category using a mouse pointer 148 or a touchscreen. The user can select all tasks in the category by clicking on the corresponding check box 150. Further to this example, the user has checked off the venue, outdoor amenities, promotional, and concessions, but has not checked off the act category because the user is a performer himself and intends on being the only act at the music concert. The user has also expanded the concessions category to reveal specific tasks for food and non-alcoholic drinks, with ranges for lead times required relative to the anticipated event date. Vendor packages are available for these two tasks, so buttons 152 are placed next to the tasks to bring up a dialog box (not shown) which allows the user to peruse the package details and select any desired package. Vendor packages may be indicated as available (i.e., buttons 152 provided) if the lead time required by the package details is within the time frame of the event based on the input event date 154, and the vendor is within the region indicated by a user input location 156. If a particular vendor package is selected by the user for completion of a given task (or multiple packages are selected), the text in its adjacent button 152 can be replaced with "vendor package selected". The user can change the search query before saving any event plan by revising the query and clicking on the "Refine Search" button 158.

Figure 7:
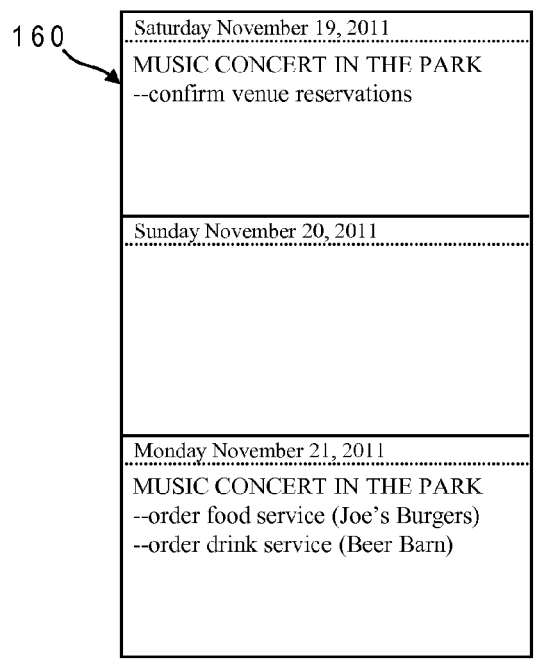
FIG. 7 is a pictorial illustration of an entry in a calendar system running on the smartphone of FIG. 5, showing example reminders that have been inserted into the user's schedule for the event in accordance with one embodiment of the present invention.

Once the user has selected the desired tasks and any vendor packages, he can click on the "Save Event Plan" button 159 to create the event plan 26 using the selections and the input event date. Scheduler and alert engine 30 can then follow up with calendar entries and timely notifications to prompt the user into completing the action items. Scheduler and alert engine 30 can assign each task one or more specific time points relative to the input event date using default times or lead times provided in selected vendor packages. Each time point is added to the user's calendar with a note using conventional application program interfaces according to the particular calendaring system employed (e.g., Google Calendar, Excel Calendar, Lotus Notes Calendar, etc.) or calendaring format used (e.g., vCalendar iCalendar, iCal hCalendar, etc.). FIG. 7 illustrates a page 160 from the user's calendaring system which may be displayed for example on smartphone 100. Further to the example of FIG. 6, one reminder has been added on Nov. 19, 2011, to confirm the venue reservations for the music concert in the park, and two reminders have been added on Nov. 21, 2011, to order vendor packages for food and drink. All of the action items may be distributed to the user's calendar at one, or they can be distributed over time as the deadlines approach. Task notes can also be distributed to other parties such as members of a team.

Figure 8:
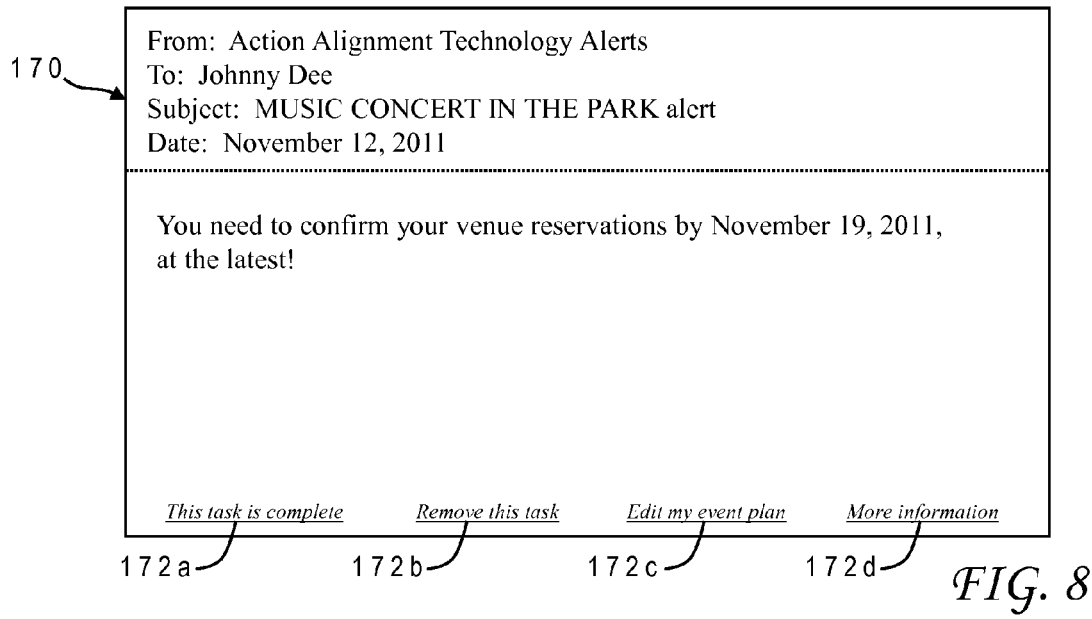
FIG. 8 is a pictorial illustration of an email alert generated by an event management system in accordance with one implementation of the present invention.

The user can additionally be prompted via alerts to the mobile computing device of impending deadlines. FIG. 8 illustrates one example of an email 170 automatically sent by the scheduler and alert engine to the user, which is received and displayed on his smartphone. This particular alert is related to the first calendar entry noted in calendar page 160 regarding venue reservations, and is sent one week ahead of time to give the user sufficient notice before the deadline. Links may be provided in the alert to facilitate management of the event plan. In this example there are four hypertext links 172a, 172b, 172c, 172d embedded in the email alert. The text of link 172a states "This task is complete", and if the user clicks on this link then an electronic coded message will be sent to the event management tool (e.g., scheduler and alert engine) indicating that the task is completed and thus does not require any further scheduling or alerts. The text of link 172b states "Remove this task", and if the user clicks on this link then a different electronic coded message will be sent to the scheduler and alert engine indicating that the task should be removed from the event plan. The text of link 172c states "Edit my even plan", and if the user clicks on this link then another event management tool can be invoked (e.g., a web browser) to display the event plan in editable form similar to that seen in FIG. 6, so the user can change the task list, anticipated event date, or find a vendor for the current task. The text of link 172d states "More information", and if the user clicks on this link then the web browser can be invoked to direct the user to a web page having detailed information on the task at hand, including vendor packages or other links to related web sites, thereby immediately connecting the user to expert information on how to efficiently accomplish the task.

If the user has failed to indicate to scheduler and alert engine 30 that a particular task has been completed by the due date, additional alerts may be sent emphatically pointing out that the action item is overdue. The email of FIG. 8 is only one example of a notification which may be sent to the user; alerts may be sent via other communication avenues such as instant messaging, telephone texting, voicemail, or tweets. In addition to alerting the user, the scheduler and alert engine can automatically notify third parties such as public media including the press, television and radio stations, promotional agents, event vendors (for example, ordering a package for a specified service), or social media such as Facebook pages.

Figure 9:
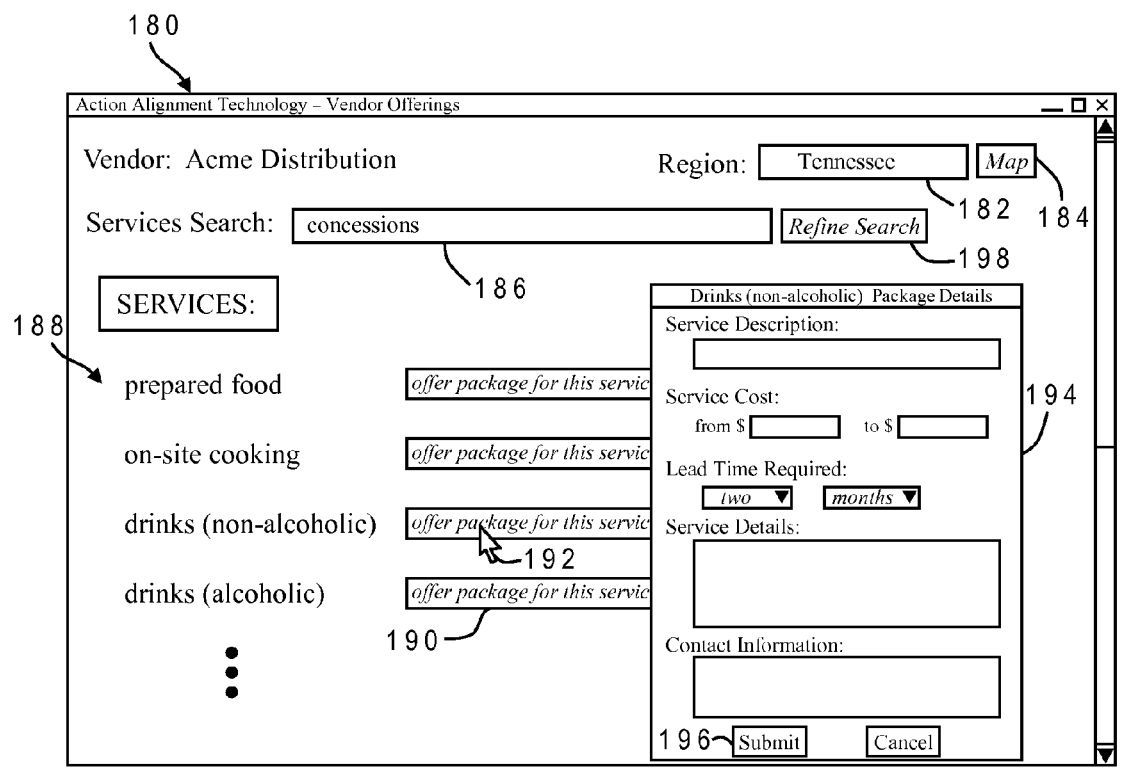
FIG. 9 is a graphical user interface for a vendor package submission tool constructed in accordance with one embodiment of the present invention.

FIG. 9 illustrates another graphical user interface 180 provided by a software application in accordance with a further implementation of the present invention which allows vendors to submit pre-packaged deals for specified tasks. Interface 180 may be presented on the display screen of a vendor workstation, such as computer system 40, although the programming which generates interface 180 (in this embodiment, task search engine 22) resides on a remote computer server and is accessed via the Internet or other network service provider. Task search engine 22 may allow different vendors to create unique accounts, and an account's username can be displayed as part of interface 180. The vendor can also specify a region where services can be provided in field 182, which may be facilitated using a map tool (not shown) accessed via button 184 to select a region by, e.g., city, county or state.

Interface 180 includes a services search field 186 which allows a vendor to enter a free-form query representing a task/service that might be needed at an event. In this example the vendor has entered the query "concessions" in services search field 186 and a list 188 of related services has been responsively generated by the task search engine and displayed in interface 180. List 188 includes "prepared food", "on-site cooking", "drinks (non-alcoholic)", and "drinks (alcoholic)". Each service in list 188 has an adjacent button 190 reading "offer package for this service". A vendor can click on any button 190 for a corresponding service which the vendor desires to offer. In this case the vendor has clicked on the button 190 for non-alcoholic drinks using the mouse pointer 192 which brings up a services input dialog box 194. Dialog box 194 allows the vendor to enter details for the package relating to this service and in this implementation includes a services description field, two numerical fields for price range of the service cost, two fields for lead time entry with pull down menus to select a number of days, weeks, or months, a service details field, and a contact information field. After the vendor has entered the details, the package is saved by clicking the submit button 196, and the task search engine can add the package details to the aggregated task database. The vendor can edit the search query to check for other possible services using the "Refine Search" button 198.

In addition to the customized event plans that can be created by a user with embodiments of the present invention, pre-populated to-do lists (action packs) can also be provided for the most common major events. For example, in the music industry, a publicist could use the "Promote a Show" action pack. As soon as the publicist activates this action pack, each to-do step for promoting a show would automatically appear on the publicist's calendar in a time-sensitive order relative to the date of the event with appropriate push notifications to mobile devices and computers. The action packs can be combined with a user's personally-tailored event plan, e.g., the event plan for the music concert in the park created in FIG. 8 could be combined with the "Promote a Show" action pack. In addition to the ability to merge a customized event plan with an action pack, the present invention also contemplates the ability to merge multiple customized event plans, from one or more users. If a group offering event services desires that a certain process be followed for a particular event, the action pack can direct an event manager along a specific path toward executing the event or project in the desired manner. Further to the "concert in the park" example, the city of Nashville could create a "concert at Riverfront Park" task pack that would lead the user through the city's desired set of tasks to appropriately execute the process of completely setting up that event.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. In particular, the invention is not limited in application to traditional event planning but rather extends to a wide variety of institutional and individual implementations. For example, a project management application according to one embodiment of the present invention can allow a manager or executive staff to create the action item lists for the employees within their organization or contractors, deploy the action packs, and track their progress through completion, in order to streamline a project. In another example, a school could upload the syllabus of all its teachers as action packs, and the students and parents can then receive push notifications for all upcoming assignments, tests, papers, etc., and the parents and teachers can track the progress of the students as they work through the action item list that is distributed to them. It is therefore contemplated that such modifications can be made without departing from the spirit or scope of the present invention as defined in the appended claims.

What is claimed is:

1. A method of constructing a database of potential tasks for an event, comprising:
searching a network to locate a network site having content relating to the event, by executing first instructions in a computer system;
parsing the content to identify at least one task relating to the event, by executing second instructions in the computer system;
associating one or more tags with the task, by executing third instructions in the computer system; and
storing the task relating to the event in association with the tags, by executing fourth instructions in the computer system;
wherein said storing stores the task relating to the event in a task database having a plurality of entries, each entry having a task description field for receiving a description of a given task, a tag field for receiving one or more tags associated with the given task, and a vendor package field for receiving one or more vendor packages having service details associated with the given task.

2. The method of claim 1, further comprising passing the network site through a filter which blocks duplicate sites, sites having low traffic ratings, and sites having poor credibility ratings.

3. The method of claim 1 wherein at least one of the tags is a keyword found in the content of the network site.

4. The method of claim 1 wherein:
the network site is generated from program code; and
said parsing is based on an occurrence of at least one term from a pre-existing library of event-related terms in a particular field embedded in the program code.

5. The method of claim 1 wherein said parsing includes interpreting a microformat structure of the network site, the microformat structure having properties including an identified event and a plurality of tasks.

6. A computer system comprising:
one or more processors which process program instructions;
a memory device connected to said one or more processors; and
program instructions residing in said memory device for constructing a database of potential tasks for an event by searching a network to locate a network site having content relating to the event, parsing the content to identify at least one task relating to the event, associating one or more tags with the task, and storing the task relating to the event in association with the tags;
wherein said program instructions store the task relating to the event in a task database having a plurality of entries, each entry having a task description field for receiving a description of a given task, a tag field for receiving one or more tags associated with the given task, and a vendor package field for receiving one or more vendor packages having service details associated with the given task.

7. The computer system of claim 6 wherein said program instructions further pass the network site through a filter which blocks duplicate sites, sites having low traffic ratings, and sites having poor credibility ratings.

8. The computer system of claim 6 wherein at least one of the tags is a keyword found in the content of the network site.

9. The computer system of claim 6 wherein the network site is generated from program code, and the parsing is based on an occurrence of at least one term from a pre-existing library of event-related terms in a particular field embedded in the program code.

10. The computer system of claim 6 wherein the parsing includes interpreting a microformat structure of the network site, the microformat structure having properties including an identified event and a plurality of tasks.

11. A computer program product comprising:
a computer-readable storage medium; and
program instructions residing in said storage medium for constructing a database of potential tasks for an event by searching a network to locate a network site having content relating to the event, parsing the content to identify at least one task relating to the event, associating one or more tags with the task, and storing the task relating to the event in association with the tags;
wherein said program instructions store the task relating to the event in a task database having a plurality of entries, each entry having a task description field for receiving a description of a given task, a tag field for receiving one or more tags associated with the given task, and a vendor package field for receiving one or more vendor packages having service details associated with the given task.

12. The computer program product of claim 11 wherein said program instructions further pass the network site through a filter which blocks duplicate sites, sites having low traffic ratings, and sites having poor credibility ratings.

13. The computer program product of claim 11 wherein at least one of the tags is a keyword found in the content of the network site.

14. The computer program product of claim 11 wherein the network site is generated from program code, and the parsing is based on an occurrence of at least one term from a pre-existing library of event-related terms in a particular field embedded in the program code.

15. The computer program product of claim 11 wherein the parsing includes interpreting a microformat structure of the network site, the microformat structure having properties including an identified event and a plurality of tasks.

16. A computer system comprising:
one or more processors which process program instructions;
a memory device connected to said one or more processors, said memory device having task database containing a plurality of entries wherein each entry has at least three fields including a task description field for receiving a description of a given task, a tag field for receiving one or more tags associated with the given task, and a vendor package field for receiving one or more vendor packages having service details associated with the given task; and program instructions residing in said memory device for searching the task database in response to a user query to find matching tasks based on comparisons of the user query to tags in the tag fields of the task database entries.

17. The computer system of claim 16 wherein the tags having weightings and said program instructions prioritize search results of the searching based on the weightings.

* * * * *